US012460400B2

(12) United States Patent
Schürle et al.

(10) Patent No.: US 12,460,400 B2
(45) Date of Patent: Nov. 4, 2025

(54) AERATOR FOR GENERATING AN AERATED LIQUID STREAM

(71) Applicant: Neoperl GmbH, Müllheim (DE)

(72) Inventors: Holger Schürle, Müllheim (DE); Wladimir Weiss, Gottenheim (DE); Wolf-Dieter Lacher, Müllheim (DE)

(73) Assignee: NEOPERL GMBH, Mullheim (DE)

( * ) Notice: Subject to any disclaimer, the term of this patent is extended or adjusted under 35 U.S.C. 154(b) by 671 days.

(21) Appl. No.: 17/437,129

(22) PCT Filed: Dec. 5, 2019

(86) PCT No.: PCT/EP2019/083908
§ 371 (c)(1),
(2) Date: Sep. 8, 2021

(87) PCT Pub. No.: WO2020/182329
PCT Pub. Date: Sep. 17, 2020

(65) Prior Publication Data

US 2022/0178120 A1 Jun. 9, 2022

(30) Foreign Application Priority Data

Mar. 8, 2019 (DE) ......................... 202019101311.7

(51) Int. Cl.
*E03C 1/084* (2006.01)
*B05D 1/02* (2006.01)

(52) U.S. Cl.
CPC ................ *E03C 1/084* (2013.01); *B05D 1/02* (2013.01)

(58) Field of Classification Search
CPC . E03C 1/084; E03C 1/08; E03C 1/086; B05D 1/02; B05B 7/0425; B05B 1/18
(Continued)

(56) References Cited

U.S. PATENT DOCUMENTS 3,334,818 A * 8/1967 Moen .................... B05B 7/0425 239/431
4,322,292 A 3/1982 Knox
(Continued)

FOREIGN PATENT DOCUMENTS

CN 201334694 Y 10/2009
CN 201920509 U 8/2011
(Continued)

OTHER PUBLICATIONS

Chinese Office Action issued Aug. 31, 2022 for Chinese Patent Application No. 201980093786.7.

*Primary Examiner* — Qingzhang Zhou
*Assistant Examiner* — Kevin Edward Schwartz
(74) *Attorney, Agent, or Firm* — Volpe Koenig

(57) ABSTRACT

A jet regulator (1) for use in a sanitary outflow fitting. The jet regulator (1) has a housing (2), a jet accelerator device (3), and a jet aeration device (5) which is mounted downstream of the jet accelerator device (3) in a flow direction (4). The stream aerating device (5) has a chamber (6) that has at least one aeration opening (7) through which air can be suctioned into the chamber (6) from the outside. An aperture plate (8) is arranged within the chamber (6), with the aperture plate dividing the chamber (6) into an air inlet part (9) and a mixing part (10), and air is suctioned from the outside in the air inlet part (9) and is mixed with liquid in the mixing part (10).

18 Claims, 5 Drawing Sheets

(58) Field of Classification Search
USPC ................................................ 239/428.5, 311
See application file for complete search history.

(56) References Cited

U.S. PATENT DOCUMENTS

| | | | | |
|---|---|---|---|---|
| 6,152,182 | A * | 11/2000 | Grether | E03C 1/08 138/41 |
| 6,357,675 | B1 | 3/2002 | Schorn et al. | |
| 7,731,107 | B2 * | 6/2010 | Grether | B05B 1/18 239/553.3 |
| 8,827,186 | B2 * | 9/2014 | Huang | E03C 1/084 239/567 |
| 9,382,700 | B2 | 7/2016 | Blum | |
| 9,447,567 | B2 * | 9/2016 | Huang | E03C 1/084 |
| 10,500,597 | B2 * | 12/2019 | Wu | E03C 1/084 |
| 2008/0210777 | A1 * | 9/2008 | Lacher | E03C 1/08 239/140 |
| 2010/0163478 | A1 * | 7/2010 | Yuan | B01D 36/04 210/251 |
| 2012/0325933 | A1 * | 12/2012 | Blum | E03C 1/08 239/428.5 |
| 2013/0015268 | A1 | 1/2013 | Huang | |
| 2013/0248621 | A1 * | 9/2013 | Huang | B05B 1/18 239/428.5 |
| 2015/0204058 | A1 * | 7/2015 | Grether | E03C 1/084 239/428.5 |
| 2015/0252555 | A1 * | 9/2015 | Huang | E03C 1/084 239/553.3 |
| 2017/0136476 | A1 | 5/2017 | Wu et al. | |
| 2018/0038085 | A1 * | 2/2018 | Birmelin | B05B 7/04 |
| 2018/0147584 | A1 * | 5/2018 | Otoguro | B05B 7/0425 |

FOREIGN PATENT DOCUMENTS

| | | |
|---|---|---|
| CN | 106703131 A | 5/2017 |
| CN | 108999993 | 12/2018 |
| KR | 20090007830 | 8/2009 |

* cited by examiner

AERATOR FOR GENERATING AN AERATED LIQUID STREAM

TECHNICAL FIELD

The invention relates to a jet regulator for producing an aerated liquid jet, having a housing, having a jet accelerator device for producing at least one accelerated jet, and having a jet aeration device which is arranged after the jet accelerator device in a flow direction and which serves for mixing liquid portions with air, wherein the jet aeration device has a chamber with an aeration opening through which air can be sucked into the chamber.

BACKGROUND

Aerated jet regulators which, for example via a coupling point formed on the housing thereof into a corresponding counterpart coupling point, can be inserted into a sanitary fitting and coupled thereto are already known. Such jet regulators are used for example for producing an aerated water jet which feels soft to the user.

A common problem of prior-art, aerated jet regulators is that splash water can exit via the aeration openings, which, for said jet regulators, are necessary and normally pass through a housing to the outside. Here, the splash water is formed within the chamber of the jet aeration device during a mixing process of water and air. Consequently, a leak can form during the use of the jet regulator, which leak leads to leakage water exiting between an outer side of the housing of the jet regulator and an inner wall of a jet regulator receiving part at the sanitary fitting.

The exiting of leakage water leads, on the one hand, to the outlet jet pattern being adversely affected, since the leakage water exits the outlet fitting in an uncontrolled manner and at an undesired position.

SUMMARY

The object is therefore to provide an aerated jet regulator for which the stated disadvantages are eliminated.

This object is achieved according to the invention by a jet regulator of the type mentioned in the introduction having one or more of the features described herein. In particular, for achieving the object, a jet regulator of the type mentioned in the introduction is proposed, wherein the jet regulator has an aperture plate which is arranged within the chamber and which divides the chamber into an air inlet part and a mixing part, wherein the mixing part and the air inlet part are connected to one another via an aperture plate opening of the aperture plate.

The features according to the invention can achieve the advantage that wetting of the aeration opening in the air inlet part by water is avoided, or at least reduced, so that said aeration opening is not closed off by water, whereby the admixing of air would be prevented, and/or gurgling noises, which can occur due to accumulation of water at the aeration opening, are avoided.

A description is given below of advantageous configurations of the invention which, alone or in combination with the features of other configurations, may optionally be combined together.

According to an advantageous refinement of the jet regulator, the aperture plate, within the chamber, may be oriented transversely or perpendicularly to a longitudinal axis of the housing and/or transversely or perpendicularly to the flow direction. It is thus possible for the drops of splash water formed in the mixing part of the jet aeration device during the mixing process to impinge on the aperture plate transversely or almost perpendicularly and, in this way, for the entry thereof into the air inlet part to be able to be prevented even more effectively.

In order to be able to prevent, in the position of use of the jet regulator, the risk of a leak which occurs via the aeration opening, the at least one aeration opening may be arranged in the air inlet part of the chamber. Furthermore, it may be particularly advantageous if provision is made for functional separation of the two parts of the chamber of the jet aeration device, such that mixing of the liquid portions with air is realized in the mixing part.

According to a further advantageous configuration of the jet regulator, the mixing part may be closed laterally. This has the advantage that the liquid mixed with air in the mixing part cannot exit the mixing part laterally. The risk of a leak occurring through laterally exiting liquid is thus significantly reduced.

In order for splashing-back of the liquid into the aeration opening from the mixing part to be able to be avoided even more effectively, it may be provided according to an advantageous configuration of the jet regulator that the aperture plate is arranged after the at least one aeration opening in the flow direction.

It may furthermore be provided that the air and the liquid flow into the mixing part through the aperture plate opening separately, that is to say in particular in two-phase form, and mixing, in particular initiated by turbulence, is first realized in the mixing part.

According to a further configuration of the jet regulator, the jet accelerator device may have at least one nozzle by way of which liquid is accelerated and/or the jet is split into multiple separate liquid portions. For example, said nozzle may in this case be a spray nozzle, by way of which an aerosol (mist) composed of fine droplets which are mixed with air can be produced. In particular, the nozzle may be configured for being able to produce a monodisperse spray, in particular composed of droplets with almost equal diameters. Preferably, the nozzle may be configured for producing a conical jet composed of liquid portions. For example, said jet may be a hollow conical jet. The jet accelerator device may preferably—in particular exclusively—have an individual nozzle or be designed as an individual nozzle. Thus, in this configuration, the jet accelerator device may have for example only one passage hole, which is designed as an individual nozzle. A particularly symmetrical jet pattern can thus be produced.

The liquid is accelerated by way of the at least one nozzle while flowing through the jet accelerator device during the use of the jet regulator, whereby a negative pressure is formed on the outflow side of the jet accelerator device, by way of which negative pressure air is sucked from the outside into the chamber via the at least one aeration opening.

Preferably, the jet accelerator device may have multiple nozzles.

A large part of the splash water produced in the mixing part splashes back in an upward direction in the edge region of the mixing part. In order to be able to prevent said splash water from passing into the air inlet part even more effectively, the aperture plate may be arranged in a continuously encircling manner along an inner wall of the chamber.

According to a further advantageous configuration of the jet regulator, the jet accelerator device may have at least one passage hole whose exit angle is configured in such a way that the liquid flows without hindrance through the aperture plate opening into the mixing part from the passage hole. In particular, the exit angle may be configured in such a way that the liquid is directed directly into the mixing part from the passage hole without in the process impinging on the aperture plate. Preferably, the liquid may be directed, by way of the setting of the exit angle, against a side wall of the mixing part. The passage hole may be formed for example by at least one nozzle, in particular the at least one nozzle already stated hereinabove.

The jet accelerator device may furthermore serve for splitting a jet, in particular an individual jet, into multiple separate liquid portions and thus be formed as a jet accelerator/jet splitter device. This has the advantage that better aeration of the jet is possible.

In order to be able to achieve even better mixing of liquid with air within the mixing part, on a wall forming the mixing part, there may be formed or arranged a flow obstacle. In particular, the flow obstacle may be formed or arranged on a side wall on which the liquid portions impinge after entering the mixing part. The flow obstacle may be any type of a structure which leads to a diversion of the flow direction. For example, said flow obstacle may be a projection which projects radially inward from the side wall.

According to a particularly advantageous configuration, the aperture plate may be of funnel-shaped form. This has the advantage that a jet, in particular a conical jet, composed of multiple separate liquid portions that is produced by the jet accelerator device may be formed to be as wide as possible transversely to the flow direction. Furthermore, the funnel-shaped configuration makes it possible for a situation in which liquid which, for example, undesirably impinges on an inflow-side surface of the aperture plate is diverted therefrom upward at an angle and/or in the direction of the at least one aeration opening to be prevented even more effectively, since the angle of incidence is consequently reduced.

According to a further advantageous configuration, a base region of the mixing part may be formed at least partially by an outlet structure. It is thus possible for a liquid/gas mixture, upon flowing through the outlet structure, to be made unidirectional and/or homogenized before the aerated jet exits on an outlet side of the jet regulator. Thus, the base region of the mixing part may be formed to be at least partially closed, preferably such that, within the mixing part, liquid accumulates and/or backs up toward the top. Here, the dimensioning of the mixing part is selected, in a manner dependent on a maximum volumetric flow rate, such that the accumulated liquid at all times remains below the aperture plate. A particularly attractive outlet jet pattern can thus be produced.

According to a particularly advantageous configuration, the aperture plate may have a sleeve-shaped section. The sleeve-shaped section may be arranged for example in the air inlet part. This has the advantage that, by way of the sleeve-shaped section, splashing-back of water can be prevented even more effectively.

The aforementioned object is further achieved by the use of an aperture plate in an aerated jet regulator for preventing exiting of splash water produced by way of air/water mixing in a mixing part from an aeration opening which is connected to the surroundings. For example, said jet regulator may be a jet regulator as is described and claimed herein. In particular, the jet regulator may be a sanitary jet regulator for insertion into, and for use in, a sanitary fitting.

BRIEF DESCRIPTION OF THE DRAWINGS

The invention will now be described in more detail on the basis of a number of exemplary embodiments, but is not restricted to these exemplary embodiments. Further exemplary embodiments emerge from the combination of the features of individual or multiple claims with one another and/or with individual or multiple features of the exemplary embodiments.

In the Figures.

DETAILED DESCRIPTION

Figure 1:
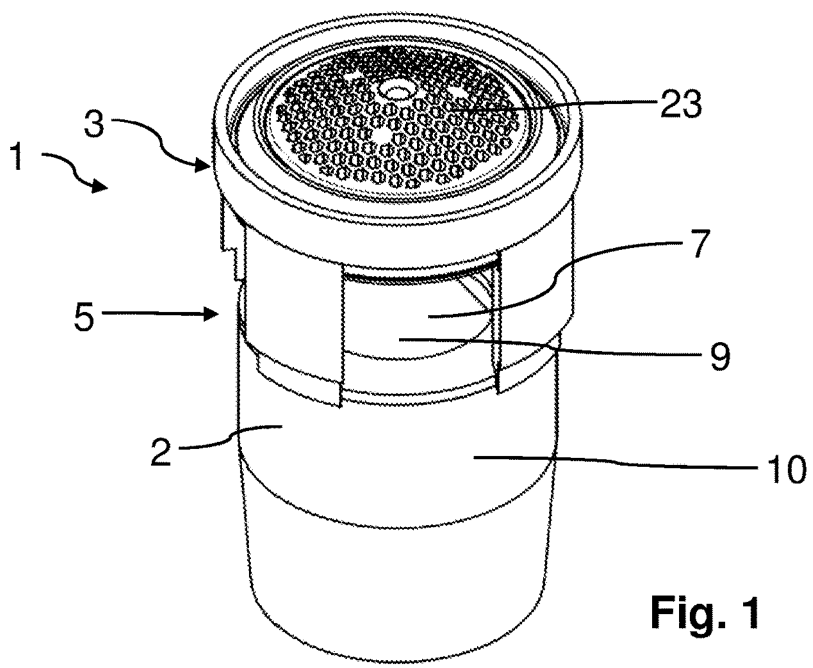
FIG. 1 shows a perspective view of a possible embodiment variant of an aerated jet regulator.
Figure 2:
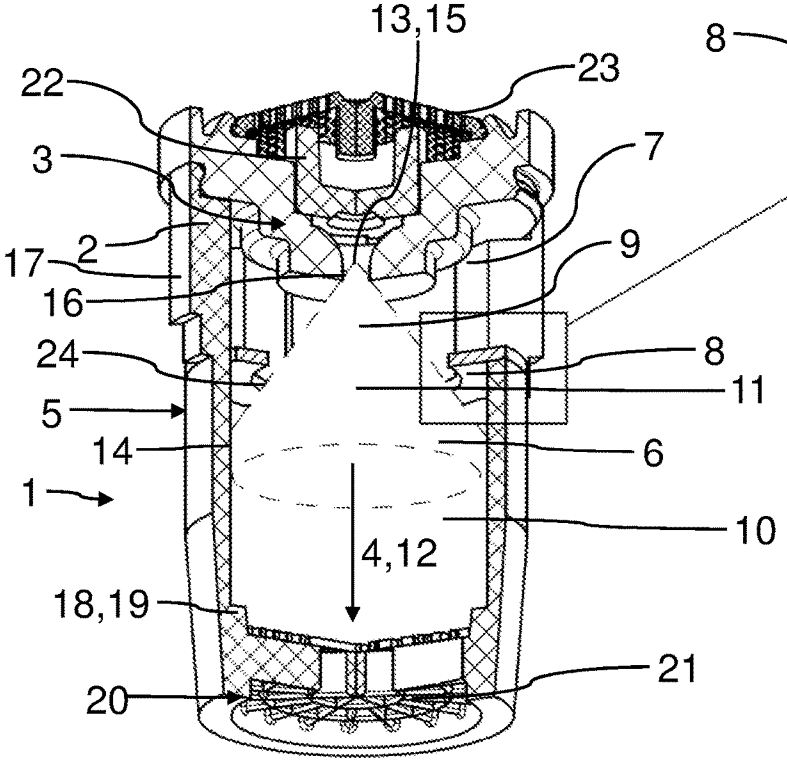
FIG. 2 shows a longitudinally sectioned view of the embodiment variant of the aerated jet regulator from FIG. 1.
Figure 3:
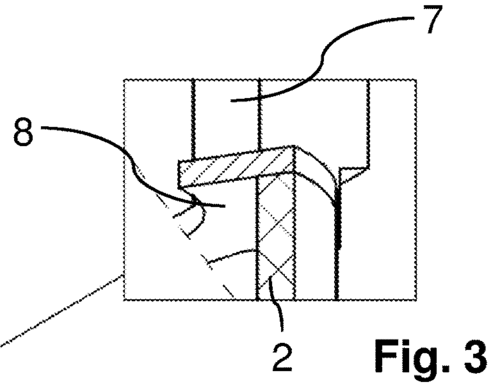
FIG. 3 shows a detail view of that part of the jet regulator which is framed in FIG. 2, which shows an edge section of the aperture plate.
Figure 4:
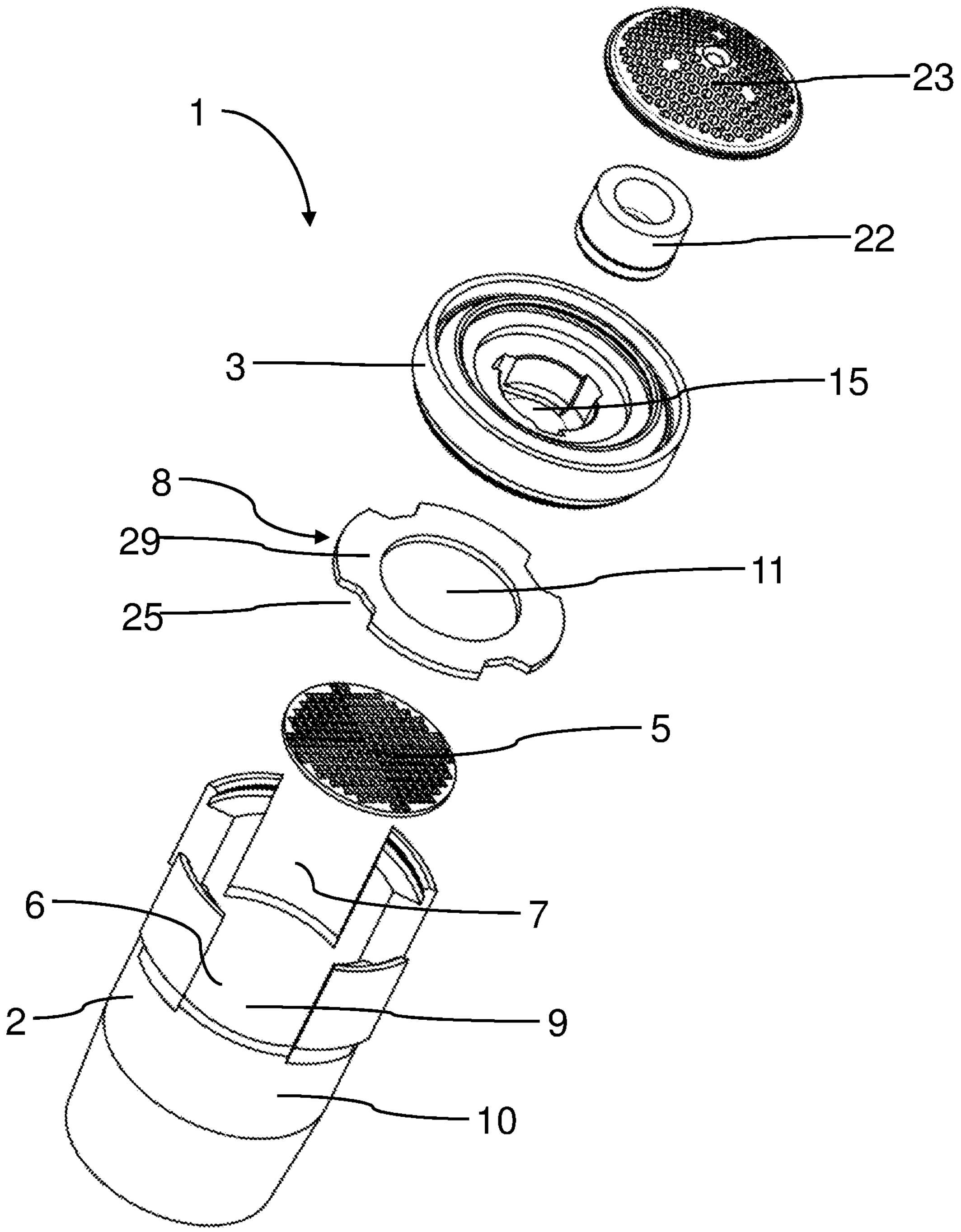
FIG. 4 shows an exploded drawing of the embodiment variant of the aerated jet regulator from FIGS. 1-3.

FIGS. 1, 2, 4, 5, 6, 8 and 9 show three embodiment variants of a jet regulator which is denoted as a whole by 1 in each case. The jet regulator 1 is configured for producing an aerated liquid jet.

The jet regulator 1 has a housing 2 via which the jet regulator 1 can be connected to a jet regulator receiving part of a sanitary outlet fitting. For this purpose, there may be formed on an outer side of the housing 2 a coupling point, which can be connected to a corresponding counterpart coupling point of the sanitary outlet fitting.

A jet accelerator device 3 is arranged or formed within the housing 2. The jet accelerator device 3 is configured for splitting a jet flowing into the jet accelerator device 3 into multiple mutually separate liquid portions.

A screen 23 may be arranged before the jet accelerator device 3 on the inflow side.

A jet aeration device 5 is arranged after the jet accelerator device 3 in the flow direction 4 (of the liquid through the jet regulator 1). The jet aeration device 5 is configured for mixing the separate liquid portions with air. For this purpose, the jet aeration device 5 has a chamber 6 in which a liquid/air mixture is produced during the use of the jet regulator 1 in an outlet fitting. The jet aeration device 5 has at least one aeration opening 7, via which air can be sucked, or is sucked during use, from the outside into the chamber 6.

In the embodiment variants illustrated in FIGS. 1 to 9, the chamber 6 of the jet aeration device 5 has in each case multiple aeration openings 7 which are formed with equal spacings to one another in a side wall 17 of the chamber 6.

An aperture plate 8 is arranged or formed within the chamber 6 and subdivides the chamber 6 into an air inlet part 9 and a mixing part 10. Here, the air inlet part 9 and the mixing part 10 are connected to one another via the aperture plate opening 11 of the aperture plate 8. Thus, entry of liquid and entry of air into the mixing part 10 via the aperture plate opening 11 are possible. The aperture plate 8 makes it possible to keep back splash water from the mixing part 10, so that said splash water does not pass to the outside via the aeration openings 7. The aperture plate 8 may be produced for example from plastic, metal, ceramic and/or other materials.

The aperture plate 8, within the chamber 6, is oriented transversely or perpendicularly to a longitudinal axis 12 of the housing 2 and/or transversely or perpendicularly to the flow direction 4 of the liquid.

The aperture plate 8 may have a planar or almost planar aperture platebody 29. Alternatively or additionally, the aperture plate 8 may have a sleeve-shaped section 28. Preferably, the sleeve-shaped section 28 can project into the air inlet part 9 and/or project from a top side of the aperture platebody 29. It is thus possible for passage of splash water from the mixing part 10 into the air inlet part 9 past the aperture plate 8 to be prevented even more effectively.

The aperture plate 8 may be integrally formed on the housing 2 or formed as a separate component. The integrally formed configuration has the advantage that the jet regulator 1 has fewer components overall. The aperture plate 8 designed as a separate component has the advantage that the production of the jet regulator 1 is simplified.

The at least one aeration opening 7 of the jet aeration device 5 is formed in a side wall 17 of that section of the chamber 6 which forms the air inlet part 9. The aeration opening 7 therefore passes through the housing 2 to the outside, so that, laterally, the air inlet part 9 is at least partially open.

By contrast, mixing of air with liquid is realized in the mixing part 10. In particular, mixing of air with liquid is realized exclusively in the mixing part 10, so that air and liquid flow into the mixing part 10 through the aperture plate opening 11 separately and/or in two-phase form. Here, the aperture plate 8 is arranged after the at least one aeration opening 7 in the flow direction 4. This has the advantage that no collision water (splash water) forms above the aperture plate 8. Consequently, the risk of leakage due to liquid exiting via the aeration opening 7 is significantly reduced.

The jet accelerator device 3 has at least one nozzle 13. Jet acceleration can be realized during the use of the jet regulator 1 by way of the at least one nozzle 13. In this way, there is formed within the chamber 6 of the jet aeration device 5 a negative pressure, by way of which air is sucked from the outside into the chamber 6 via the aeration opening 7, which air can then be used for producing the aerated jet. It may furthermore be provided that, by way of the jet accelerator device 3, in addition, a jet is split into multiple separate liquid portions, which improves the subsequent jet aeration.

Furthermore, the jet can be split into multiple separate liquid portions by way of the at least one nozzle 13. This has the advantage that, through the splitting of the jet into multiple separate liquid portions, better mixing of the liquid with air within the jet aeration device 5 can be realized. For example, the nozzle 13 may be formed as a spray nozzle for forming a mist and/or aerosol.

The nozzle 13 may, for example, be configured for producing a conical jet 24 composed of multiple liquid portions. Preferably, the conical jet 24 can be formed in such a way that a diameter of the conical jet 24 at the height of the aperture plate opening 11 is smaller than the diameter of the aperture plate opening 11.

A height of the conical jet 24 may be greater than a height of the air inlet part 9 of the chamber 6. The conical jet 24 can thus extend from the air inlet part 9 as far as the mixing part 10 through the aperture plate 8. This has the advantage that, firstly, accumulation of splash water before the aperture plate 8 in the flow direction 4 can be prevented and, furthermore, particularly good liquid/air mixing is realized within the mixing part 10.

The nozzle 13 may be formed for example by insertion of an insert part 22 into a passage hole 15 of the jet accelerator device 3. The nozzle characteristic can be influenced by changing the diameter of the insert part 22 and/or the passage hole 15.

The aperture plate 8 may be arranged within the chamber 6 in such a way that it is in bearing contact along an inner wall 14 of the chamber 6 in a continuously encircling manner. It is thus possible for splash water to be kept back especially in the edge region. Splash water which splashes back through the aperture plate opening 11 is conveyed back into the mixing part 10 by the air stream and/or the inflowing liquid portions.

The aperture plate 8 may have an aperture platebody 29 in which recesses 25 are formed. In the assembly position, the side walls 17 which bound the air inlet part 9 laterally can engage into the recesses 25 and keep the perforated plate 8 in its position. Particularly simple assembly of the jet regulator 1 is thus possible.

The housing 2 may preferably be of one-part form. All the components of the jet regulator 1 can then be inserted successively into the housing 2 and consequently held in their intended position. Particularly simple assembly of the jet regulator 1 is thus likewise possible.

The housing 2 may for example be of sleeve-shaped form and/or at least partially cylindrical form.

The jet accelerator device 3 has at least one passage hole 15, which may be formed for example by the aforementioned nozzle 13. As is shown in the figures, the jet accelerator device 3 may have only an individual nozzle as passage hole 15.

The mixing part 10 may have a larger volume than the air inlet part 9, as is shown in FIGS. 1 to 4 and 8. Since the air inlet part 9 is not configured for mixing of liquid and air, the structural space required for this can be reduced.

Alternatively or additionally, the aeration openings 7 may be formed with the largest possible surface area, so that, for example, a sum of the surface areas of the closed side walls 17 of the air inlet part 9 amounts to a smaller surface portion at the air inlet part 9, in particular at a lateral surface of the air inlet part 9, than a sum of the surface areas of the aeration openings 7. Particularly good intake of air with the lowest possible space requirement is thus possible.

In order to be able to achieve particularly good mixing of liquid and air despite a relatively small volume of the mixing part 10, the mixing part 10 may have an impingement body 26 which is arranged as a flow obstacle 18 within the flow path. The impingement body 26 may at least partially project into the air inlet part 9. Preferably, in the assembly position, a highest point of the impingement body 26 is at the height of an upper edge of the sleeve-shaped section 28 of the aperture plate 8.

An exit angle 16 of the passage hole 15 may be set in such a way that, during the use of the jet regulator 1, the liquid flows without hindrance through the aperture plate opening 11 into the mixing part 10 from the passage hole 15. That is to say, without hindrance insofar as the liquid on the inflow side in the flow direction 4 does not impinge on the aperture platesurface, but flows directly through the aperture plate opening 11 of the aperture plate 8. The setting of the exit angle 16 of the at least one passage hole 15 results in the liquid, in the embodiment variant in FIGS. 1 to 4, 8 and 9, being directed against a side wall 17 of the mixing part 10 during the use of the jet regulator 1. The collision of the liquid with the side wall 17 results in turbulence being generated within the mixing part 10, by way of which turbulence better mixing of the liquid portions with air is possible.

Figure 5:
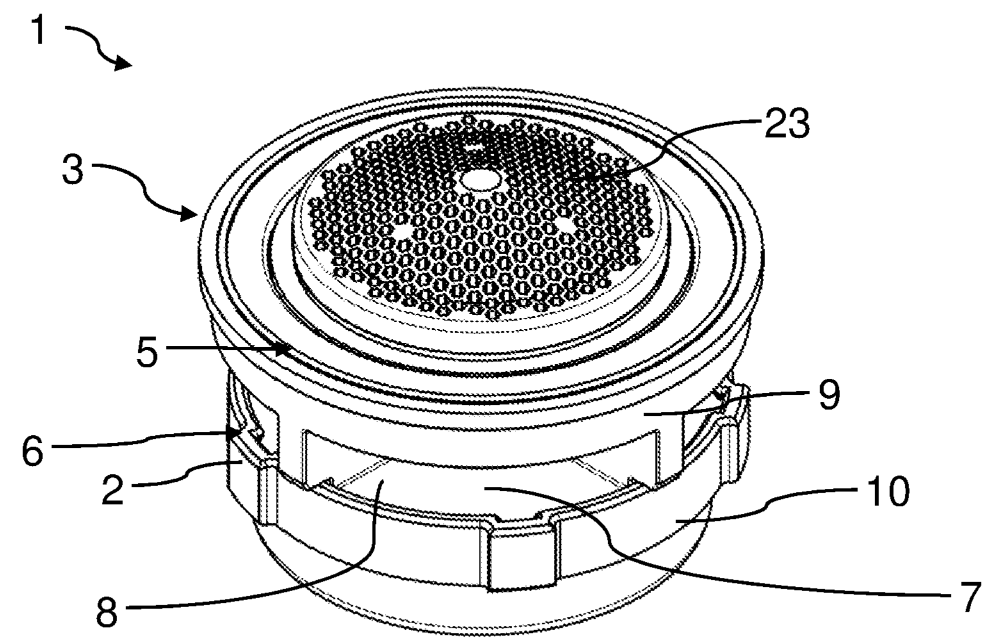
FIG. 5 shows a perspective view of a further possible embodiment variant of an aerated jet regulator.
Figure 6:
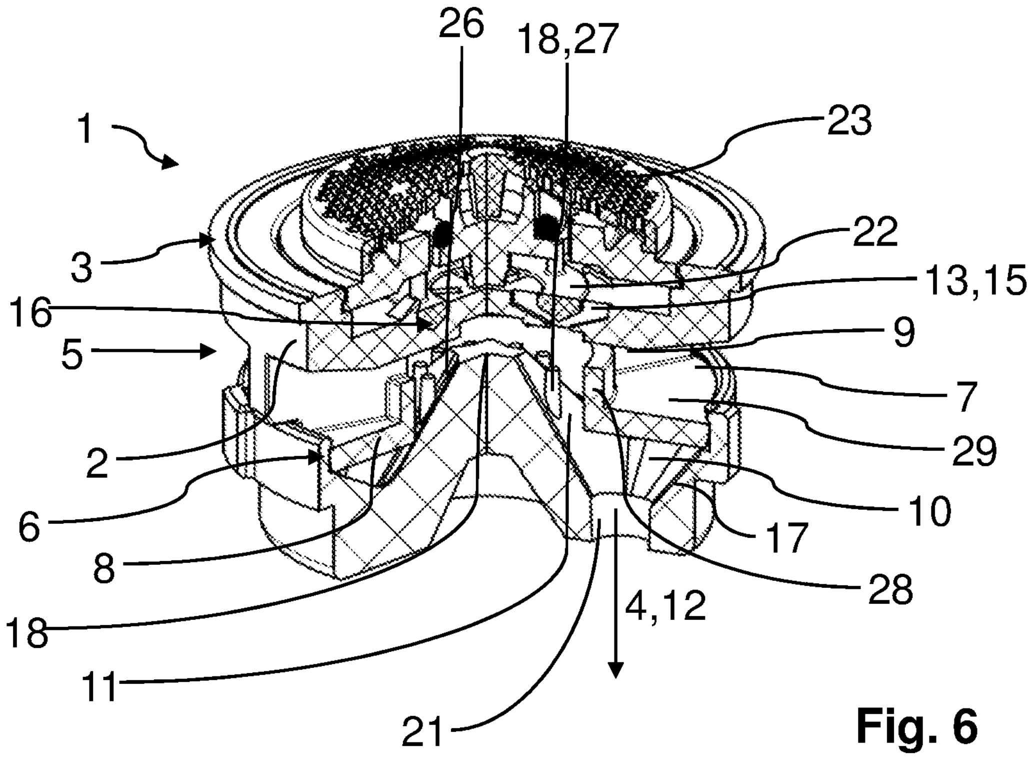
FIG. 6 shows a sectional view of the partially sectioned embodiment variant from FIG. 5.
Figure 7:
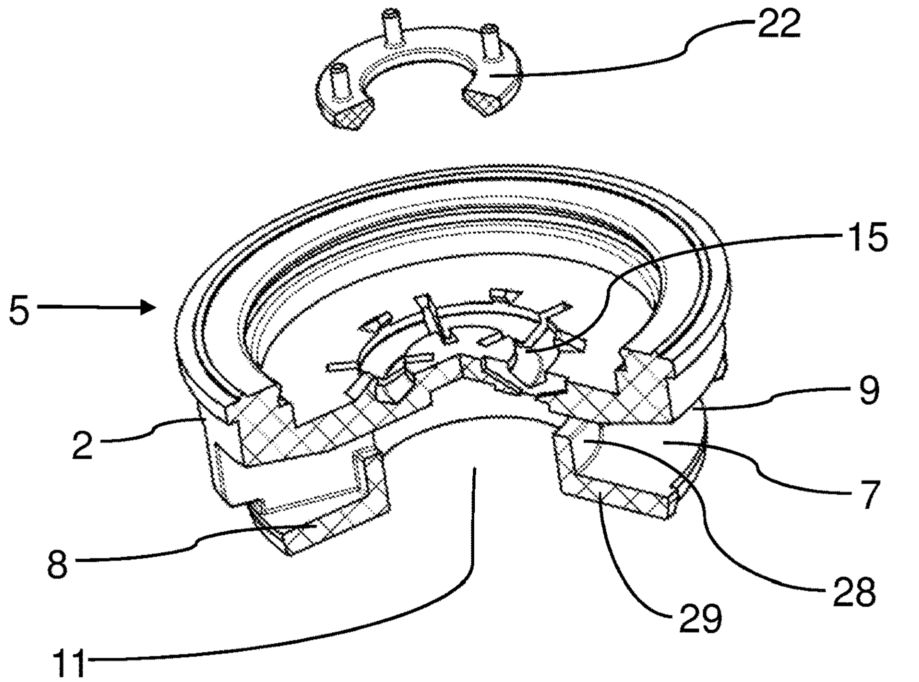
FIG. 7 shows a partially sectioned illustration of a jet aeration device of the jet regulator from FIGS. 5 and 6.

In the embodiment variant from FIGS. 5 to 7, the exit angle 16 of the passage hole 15 is set in such a way that the jet accelerated, and/or split, by the jet accelerator device 3 impinges in particular directly and/or without hindrance on the impingement body 26.

In order to be able to further improve the mixing, a flow obstacle 18 may be formed within the mixing part 10, for example on the side wall 17 of the mixing part 10. The side wall 17 forms an impingement surface, wherein the flow obstacle 18 is oriented transversely to the impingement surface. The flow obstacle 18 may have for example the form of a projection 19. The projection 19 of the embodiment variant as per FIGS. 1 to 4, 8 and 9 projects radially inward and in this way inwardly diverts those liquid portions flowing into the mixing part 10 which flow along the inner wall 14. Particularly good mixing of the liquid portions with air is thus possible.

Alternatively or additionally, the impingement body 26 on which the accelerated and/or split liquid portions impinge may be arranged in the mixing part 10. For example, the impingement body 26 may be of conical form. The impingement body 26 has an impingement surface on which multiple impingement elements 27 are formed or arranged. The impingement elements 27 may for example be of peg-shaped form and project from the impingement surface and/or be oriented transversely to the impingement surface of the impingement body 26. Preferably, the impingement elements 27 may be oriented parallel to the flow direction 4.

Figure 8:
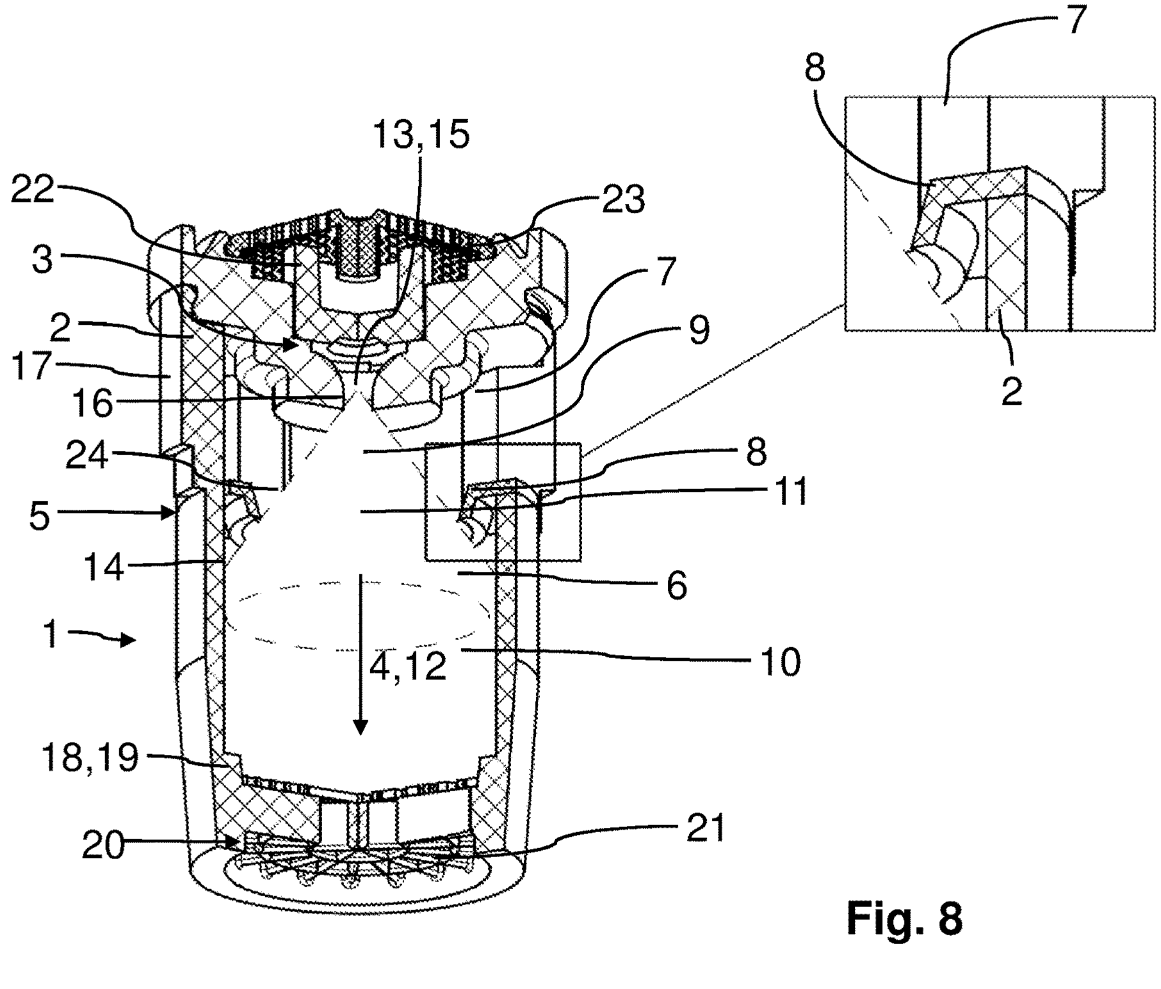
FIG. 8 shows a longitudinally sectioned view of a further embodiment variant of an aerated jet regulator, which has a funnel-shaped aperture plate.
Figure 9:
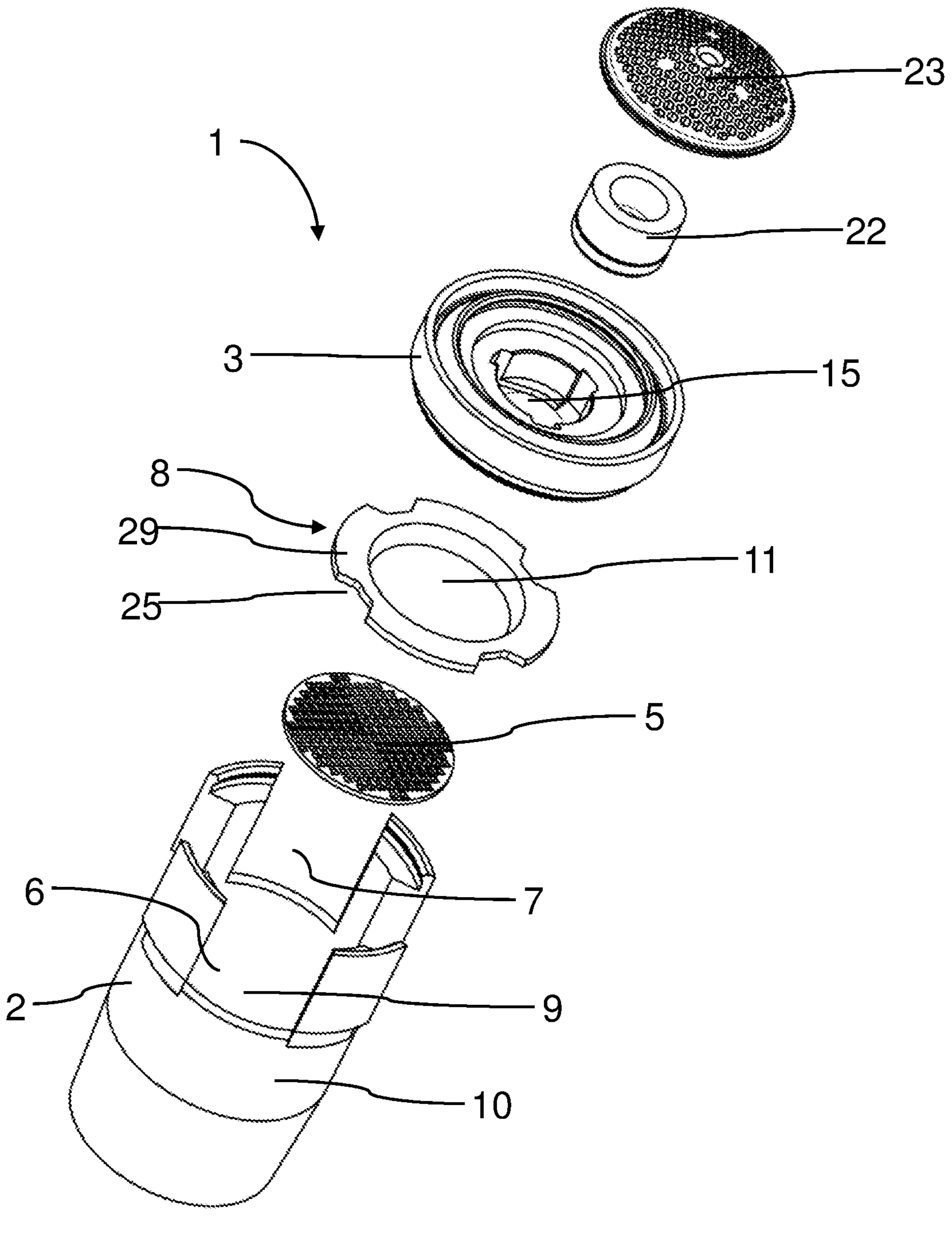
FIG. 9 shows an exploded drawing of the embodiment variant of the aerated jet regulator from FIG. 8.

According to an embodiment variant, shown in FIGS. 8 and 9, of a jet regulator 1, the aperture plate 8 may be of at least partially funnel-shaped form. This has the advantage that splash water from the mixing part 10 is kept back by the aperture plate 8 even more effectively if the exit angle 16 of the passage hole 5 is configured in such a way that the liquid collides with a side wall 17 of the mixing part 10.

In order to produce a particularly attractive jet outlet pattern, a base region 20 of the mixing part 10 may be formed at least partially by an outlet structure 21. The outlet structure 21 may have multiple outlet openings by way of which a multiplicity of individual jets are formed on an outlet side of the jet regulator 1.

The invention therefore relates in particular to an aerated jet regulator 1 for use in a sanitary outlet fitting, wherein the jet regulator 1 has a housing 2, has a jet accelerator device 3, and has a jet aeration device 5 which is arranged after the jet accelerator device 3 in a flow direction 4, wherein the jet aeration device 5 has a chamber 6 which has at least one aeration opening 7 through which air can be sucked from the outside into the chamber 6, wherein, within the chamber 6, there is arranged an aperture plate 8 which subdivides the chamber 6 into an air inlet part 9 and a mixing part 10, wherein, in the air inlet part 9, air is sucked in from the outside and, in the mixing part 10, liquid and air are mixed.

LIST OF REFERENCE SIGNS

1 Jet regulator
2 Housing
3 Jet accelerator device
4 Flow direction
5 Jet aeration device
6 Chamber
7 Aeration opening
8 Aperture plate
9 Air inlet part
10 Mixing part
11 Aperture plate opening
12 Longitudinal axis of the housing
13 Nozzle, individual nozzle
14 Inner wall of the chamber
15 Passage hole
16 Exit angle
17 Side wall
18 Flow obstacle
19 Projection
20 Base region
21 Outlet structure
22 Insert part
23 Screen
24 Conical jet
25 Recess
26 Impingement body
27 Impingement element
28 Sleeve-shaped section
29 Aperture platebody

The invention claimed is:

1. A jet regulator (1) for producing an aerated liquid jet, the jet regulator comprising:
- a housing (2),
- a jet accelerator device (3) for producing at least one accelerated jet located in the housing,
- a jet aeration device (5) which is arranged after the jet accelerator device (3) in a flow direction (4) and which serves for mixing liquid portions with air, the jet aeration device (5) has a chamber (6) with at least one aeration opening (7) through which air can be sucked into the chamber (6), and
- an aperture plate (8) arranged within the chamber (6) and which divides the chamber (6) into an air inlet part (9) and a mixing part (10),
- wherein the mixing part (10) and the air inlet part (9) are connected to one another via an aperture plate opening (11) of the aperture plate (8),
- wherein a side wall (17) of the mixing part (10) is oriented non-parallel to a longitudinal axis (12) of the housing (2),
- wherein an impingement body (26) is arranged in the mixing part (10) and at least partially projects into the air inlet part (9),
- wherein the impingement body (26) has a conical form, and
- wherein the impingement body (26) has an impingement surface on which multiple impingement elements (27) are arranged, each of the multiple impingement elements (27) being pegs and projecting from the impingement surface of the impingement body (26) in a direction opposite the flow direction (4).

2. The jet regulator (1) as claimed in claim 1, wherein the aperture plate (8), within the chamber (6), is oriented transversely or perpendicularly to at least one of the longitudinal axis (12) of the housing (2) or the flow direction (4).

3. The jet regulator (1) as claimed in claim 1, wherein the at least one aeration opening (7) is arranged in the air inlet part (9) of the chamber (6).

4. The jet regulator (1) as claimed in claim 1, wherein the mixing part (10) is closed laterally.

5. The jet regulator (1) as claimed in claim 1, wherein the aperture plate (8) is arranged after the at least one aeration opening (7) in the flow direction (4).

6. The jet regulator (1) as claimed in claim 1, wherein the jet accelerator device (3) has at least one nozzle (13) by which liquid is at least one of accelerated or split into multiple separate liquid portions.

7. The jet regulator (1) as claimed in claim 1, wherein the aperture plate (8) is arranged in a continuously encircling manner along an inner wall (14) of the chamber (6).

8. The jet regulator (1) as claimed in claim 1, wherein the jet accelerator device (3) has at least one passage hole (15) having an exit angle (16) that is configured such that the liquid flows without hindrance through the aperture plate opening (11) into the mixing part (10) from the passage hole (15).

9. The jet regulator (1) as claimed in claim 1, wherein on the side wall (17) of the mixing part (10) there is formed or arranged at least one flow obstacle (18) which projects radially inward from the side wall (17).

10. The jet regulator (1) as claimed in claim 1, wherein the aperture plate (8) is funnel-shaped.

11. The jet regulator (1) as claimed in claim 1, wherein a base region (20) of the mixing part (10) is formed at least partially by an outlet structure (21).

12. The jet regulator (1) as claimed in claim 1, wherein the aperture plate (8) has a sleeve-shaped section (28).

13. The jet regulator (1) as claimed in claim 1, wherein the jet accelerator device (3) is configured for splitting a jet into multiple separate liquid portions.

14. The jet regulator (1) as claimed in claim 1, wherein the jet accelerator device (3) has an individual nozzle.

15. A method of dispensing a liquid using the jet regulator (1) as claimed in claim 1, the method comprising, preventing exiting of splash water produced by way of air and water mixing in the mixing part (10) from the at least one aeration opening (7) which is connected to surroundings of the jet regulator by drawing air into the air inlet part (9) of the chamber, and directing the liquid via the jet accelerator device (3) through the aperture plate opening (11) of the aperture plate (8) and into the mixing part (10) of the chamber for the air and water mixing.

16. The jet regulator (1) as claimed in claim 1, wherein mixing of the liquid portions with air is realized in the mixing part (10).

17. The jet regulator (1) as claimed in claim 9, wherein the at least one flow obstacle is a projection (19).

18. The jet regulator (1) as claimed in claim 1, wherein the jet accelerator device (3) is formed as an individual nozzle.

* * * * *